United States Patent
Foster (10) Patent No.: US 8,113,988 B2
(45) Date of Patent: Feb. 14, 2012

(54) HYDRAULIC CONTROL MODULE FOR VEHICLE TRANSMISSION AND DIAGNOSTIC DETECTION METHOD FOR THE SAME

(75) Inventor: Michael D. Foster, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 803 days.

(21) Appl. No.: 12/185,849

(22) Filed: Aug. 5, 2008

(65) Prior Publication Data

US 2009/0253552 A1    Oct. 8, 2009

Related U.S. Application Data

(60) Provisional application No. 61/042,451, filed on Apr. 4, 2008.

(51) Int. Cl.
- *F16H 61/16* (2006.01)
- *F16H 61/18* (2006.01)
- *G06F 7/00* (2006.01)
- *G06F 17/00* (2006.01)

(52) U.S. Cl. ............. 477/125; 477/906; 701/62; 701/63

(58) Field of Classification Search .................. 477/125; 701/62, 63
See application file for complete search history.

(56) References Cited

U.S. PATENT DOCUMENTS

| | | | | |
|---|---|---|---|---|
| 4,951,205 | A * | 8/1990 | Lowe et al. ...................... | 701/63 |
| 6,375,591 | B1* | 4/2002 | Wakahara et al. ............ | 475/119 |
| 6,623,402 | B2* | 9/2003 | Nishina et al. .................. | 477/92 |
| 6,966,862 | B2* | 11/2005 | Inuta .............................. | 475/119 |
| 7,264,573 | B2* | 9/2007 | Takagi .......................... | 477/156 |
| 7,563,189 | B2* | 7/2009 | Inuta ............................. | 475/116 |
| 7,682,276 | B2* | 3/2010 | Nozaki et al. ................. | 475/123 |
| 2006/0246794 | A1 | 11/2006 | Foster et al. | |
| 2008/0176706 | A1* | 7/2008 | Wu et al. ............................ | 477/5 |
| 2008/0176709 | A1* | 7/2008 | Wu et al. ....................... | 477/143 |
| 2010/0311542 | A1* | 12/2010 | Long ............................ | 477/156 |

FOREIGN PATENT DOCUMENTS

JP            2007309500  A    * 11/2007

* cited by examiner

*Primary Examiner* — Tisha Lewis
(74) *Attorney, Agent, or Firm* — Quinn Law Group, PLLC (57) ABSTRACT

A detection scheme for diagnosing failure of clutch control components in a hydraulic control module of a power transmission utilizes pressure switch sensors to detect the position of each of the valves associated with the clutch control mechanization. The mechanization of these sensors with the valves provides the ability to clearly define the position of each of the valves, while also enabling the transmission electro-hydraulic control module (TEHCM) to diagnose the state of health of each pressure switch. The detection scheme may then differentiate between a failed switch and a failed (e.g., "stuck" or "out of position") valve, while preventing unexpected and undesired shift sequencing within the transmission.

20 Claims, 4 Drawing Sheets

| X Blocking | C1 | C3 | PS1 | PS3 |
|---|---|---|---|---|
| 0 | 0 | 0 | | |
| 0 | 0 | 1 | | |
| 0 | 1 | 0 | | |
| 0 | 1 | 1 | | |
| 1 | 0 | 0 | | |
| 1 | 0 | 1 | | |
| 1 | 1 | 0 | | |
| 1 | 1 | 1 | | |

*Fig-3*

| Y Blocking | C2 | C4 | PS2 | PS4 |
|---|---|---|---|---|
| 0 | 0 | 0 | | |
| 0 | 0 | 1 | | |
| 0 | 1 | 0 | | |
| 0 | 1 | 1 | | |
| 1 | 0 | 0 | | |
| 1 | 0 | 1 | | |
| 1 | 1 | 0 | | |
| 1 | 1 | 1 | | |

*Fig-4*

| | N/C PCS C1 | N/O PCS C2 | N/C PCS C3 | N/O PCS C4 | X Blk | Y Blk |
|---|---|---|---|---|---|---|
| All Available | C1 | C2 | C3 | C4 | 1 | 1 |
| M3/G3/M4 | ~~C1~~ | C2 | C3 | C4 | 0 | 1 |
| M1/G1/M2 | C1 | ~~C2~~ | C3 | C4 | 1 | 0 |
| M2/G2/M3 | C1 | C2 | ~~C3~~ | C4 | 0 | 0 |

*Fig-5*

HYDRAULIC CONTROL MODULE FOR VEHICLE TRANSMISSION AND DIAGNOSTIC DETECTION METHOD FOR THE SAME

CLAIM OF PRIORITY AND CROSS-REFERENCE TO RELATED APPLICATION

This application claims the benefit of and priority to U.S. Provisional Patent Application No. 61/042,451, filed on Apr. 4, 2008, which is hereby incorporated by reference in its entirety.

TECHNICAL FIELD

The present invention relates generally to motorized vehicle powertrains, and more specifically to hydraulic control modules for vehicle transmissions, and diagnostic detection methodologies for the same.

BACKGROUND OF THE INVENTION

In general, motorized vehicles, such as the conventional automobile, include a powertrain that is comprised of an engine in power flow communication with a final drive system (e.g., rear differential and wheels) via a multi-speed power transmission. Hybrid type powertrains generally employ an internal combustion engine (ICE) and one or more motor/generator units that operate either individually or in concert to propel the vehicle. That is, power output from the engine and motor/generators are transferred through planetary gearing in the multi-speed transmission for communication to the vehicle's final drive system. The primary function of the transmission is to regulate speed and torque to meet operator demands for vehicle speed and acceleration.

Most automatic transmissions include a number of gear elements, generally in the nature of one or more epicyclic planetary gear sets, for coupling the transmission's input and output shafts. Traditionally, a related number of hydraulically actuated torque establishing devices, such as clutches and brakes (the term "torque transmitting device" often used to refer to both clutches and brakes), are selectively engageable to activate the aforementioned gear elements for establishing desired forward and reverse speed ratios between the transmission's input and output shafts. Engine torque and speed are converted by the transmission, for example, in response to the tractive-power demands of the motor vehicle.

Shifting from one speed ratio to another is performed in response to engine throttle and vehicle speed, and generally involves releasing one or more "off-going" clutches associated with the current or attained speed ratio, and applying one or more "on-coming" clutches associated with the desired or commanded speed ratio. To perform a "downshift", a shift is made from a low speed ratio to a high speed ratio. That is, the downshift is accomplished by disengaging a clutch associated with the lower speed ratio, and engaging a clutch associated with the higher speed ratio, to thereby reconfigure the gear set(s) to operate at the higher speed ratio. Shifts performed in the above manner are termed clutch-to-clutch shifts, and require precise timing in order to achieve high quality shifting.

To operate properly, most power transmissions require a supply of pressurized fluid, such as conventional transmission oil. The pressurized fluid may be used for such functions as cooling and lubrication. The lubricating and cooling capabilities of transmission oil systems greatly impact the reliability and durability of the transmission. Additionally, multi-speed power transmissions require pressurized fluid for controlled engagement and disengagement, on a desired schedule, of the various torque transmitting mechanisms that operate to establish the speed ratios within the internal gear arrangement.

Transmissions are traditionally supplied with hydraulic fluid by a wet sump (i.e., internal reservoir) oil system, which is separate from the engine's oil system. The fluid is typically stored in a main reservoir or main sump volume where it is introduced to a pickup or inlet tube for communication to one or more hydraulic pumps. In hybrid-type transmissions, it is conventional practice to have one hydraulic pump assembly that is driven by the engine (e.g., via the engine crankshaft) for supplying hydraulic pressure to the transmission control system. It is also conventional practice to have an additional pump which is driven from alternate power sources so that pressure is available when the engine is not running and the vehicle is in motion.

The various hydraulic subsystems of a power transmission are typically controlled through operation of a hydraulic circuit, also known as a hydraulic control module. The hydraulic control module, in collaboration with an electronic control unit, regulates the flow of pressurized fluid for cooling and lubricating the transmission components, and the selective pressurization of the various torque-transmitting mechanisms to enable transmission shifting and vehicle braking. The hydraulic control module traditionally engages (actuates) or disengages (deactivates) the various transmission subsystems through the manipulation of hydraulic pressure generated within the transmission oil pump assembly with a plurality of valves. The valves used in a conventional hydraulic control circuit commonly comprise electro-hydraulic devices (e.g., solenoids), spring-biased accumulators, spring-biased spool valves, and ball check valves.

SUMMARY OF THE INVENTION

The present invention provides advanced hardware diagnostic detection for the clutch control components in a hydraulic control module of a multi-mode hybrid transmission. The detection scheme utilizes pressure switch sensors to detect the position of each of the valves associated with the clutch control mechanization. The mechanization of these sensors with the valves provides the ability to clearly define the position of each of the valves, while also enabling the transmission electro-hydraulic control module (TEHCM) to diagnose the state of health of each pressure switch. This will allow the diagnostics to differentiate between a failed switch and a failed (e.g., "stuck" or "out of position") valve.

One of the primary benefits of this invention is the ability to safely diagnose the clutch control components in a power transmission. That is, a TEHCM operating in accordance with the present invention can systematically identify the position and state of health of each of the clutch control valves and, from that, determine what clutches are available to ensure that any undesired clutches are locked out and unable to apply during vehicle operation. The detection scheme of the present invention prevents unexpected and undesired shift sequencing within the transmission.

In accordance with one embodiment of the present invention, a hydraulic control module for a vehicle transmission is provided. The transmission has a plurality of torque transmitting devices and a hydraulic fluid reservoir. The hydraulic control module includes a controller, two trim valves, two pressure switches, and a blocking valve.

The first of the trim valves is in fluid communication with both the hydraulic fluid reservoir and a first of the plurality of torque transmitting devices. The first trim valve is configured to selectively actuate the first torque transmitting device. The second of the trim valves is in fluid communication with both the hydraulic fluid reservoir and a second of the plurality of torque transmitting devices. The second trim valve is configured to selectively actuate the second torque transmitting device.

The first of the pressure switches is in fluid communication with the first trim valve, and in operative communication with the transmission controller. The first pressure switch is configured to monitor or detect whether the first trim valve is in an engaged or disengaged state, and transmit signals indicative thereof to the controller. In a similar respect, the second of the pressure switches is in fluid communication with the second trim valve and in operative communication with the controller. The second pressure switch is configured to monitor or detect whether the second trim valve is in an engaged or disengaged state, and transmit signals indicative thereof to the controller.

The first blocking valve is in fluid communication with the first and second trim valves and the first and second pressure switches. The first blocking valve is preferably configured to selectively simultaneously reverse the hydraulic polarity (e.g., switch from fill to exhaust, or from exhaust to fill) of the first and second pressure switches. The controller is operable to detect if either or both of the pressure switches unintentionally toggles, and to shift the transmission to a safe operating mode in response to either of the pressure switches unintentionally toggling.

In accordance with one aspect of this particular embodiment, shifting the transmission to a safe operating mode includes disabling any/all of the trim valves that are in operative communication with a pressure switch that unintentionally toggles.

According to yet another aspect, the hydraulic control module also includes two more trim valves, another two pressure switches, and a second blocking valve. The third of the trim valves is in fluid communication with the hydraulic fluid reservoir and a third of the plurality of torque transmitting devices. The third trim valve is configured to selectively actuate the third torque transmitting device. The fourth of the trim valves is in fluid communication with both the hydraulic fluid reservoir and a fourth of the plurality of torque transmitting devices. The fourth trim valve is configured to selectively actuate the fourth torque transmitting device.

The third of the pressure switches is in fluid communication with the third trim valve and in operative communication with the controller. The third pressure switch is configured to monitor or detect whether the third trim valve is in an engaged or disengaged state, and transmit signals indicative thereof to the controller. Similarly, the fourth of the pressure switches is in fluid communication with the fourth trim valve and in operative communication with the controller. The fourth pressure switch is configured to monitor or detect whether the fourth trim valve is in an engaged or disengaged state, and transmit signals indicative thereof to the controller.

The second blocking valve is in fluid communication with the third and fourth trim valves and the third and fourth pressure switches. The second blocking valve is preferably configured to selectively simultaneously reverse the hydraulic polarity of the third and fourth pressure switches. In this instance, the controller is further operable to detect if either or both of the third and fourth pressure switches unintentionally toggles, and to shift the transmission to a safe operating mode in response to either of the third and fourth pressure switches unintentionally toggling.

According to another aspect of this embodiment, the controller is further operable to identify which clutch control component has failed in response to any of the pressure switches unintentionally toggling. In this particular instance, the controller then determines any undesirable transmission operating modes that require use of the failed clutch control component(s), and commands the transmission to operate in a transmission operating mode other than the undesirable operating modes.

According to yet another aspect, determining or identifying the failed clutch control component includes, in any order: determining if the pressure switch or switches that unintentionally toggled have failed; if not, determining if the respective trim valve attached to that pressure switch has failed (e.g., is stuck or inadvertently shifts); and, if not, determining if the blocking valve has failed. One way of determining if a pressure switch has failed includes toggling the blocking valve, and detecting if the pressure switches fails to toggle. In a similar regard, determining if one or both of the trim valves has failed may include toggling the respective blocking valve, and detecting if the corresponding pressure switches toggles. Finally, one manner of determining if the blocking valve has failed includes toggling the blocking valve, and detecting if both of the pressure switches in fluid communication therewith fail to toggle.

According to yet another aspect of this embodiment, the first trim valve is in direct fluid communication with the first pressure switch, and the second trim valve is in direct fluid communication with the second pressure switch. Contrastingly, the first trim valve is preferably characterized by a lack of a direct fluid communication with the second pressure switch, whereas the second trim valve is characterized by a lack of a direct fluid communication with the first pressure switch. Ideally, the various trim valves and blocking valves are all spool-type valve assemblies.

According to another embodiment of the present invention, a method of diagnosing failure of clutch control components in a hydraulic control module of a power transmission is provided. The clutch control components include a first trim valve in operative communication with a first pressure switch, a second trim valve in operative communication with a second pressure switch, and a blocking valve in fluid communication with the first and second trim valves and the first and second pressure switches. The blocking valve is preferably configured to selectively simultaneously reverse the hydraulic polarity of the first and second pressure switches. The first and second pressure switches toggle in response to toggling of a respective trim valve.

The method includes the steps of: detecting if either or both of the first or second pressure switches unintentionally toggles; shifting the transmission to a safe operating mode in response to either pressure switch unintentionally toggling; determining or identifying a failed clutch control component if either of the pressure switches unintentionally toggles; determining undesirable transmission operating modes that require use of the failed clutch control component; and operating the transmission in a transmission operating mode other than the undesirable operating modes.

According to one aspect of this embodiment, shifting the transmission to a safe operating mode includes disabling any/all trim valves that are in operative communication with a pressure switch that unintentionally toggles.

According to another aspect, determining a failed clutch control component includes, in any order: determining if the pressure switch that unintentionally toggled has failed; if it didn't, determining if the respective trim valve that is in operative communication with the pressure switch that unintentionally toggled has failed; and, if not, determining if the blocking valve has failed. In this instance, determining if either of the pressure switches has failed preferably includes toggling the blocking valve, and detecting if one of the pressure switches fails to toggle. Moreover, determining if a trim valve failed preferably includes toggling the blocking valve, and detecting if its respective pressure switch toggles (or fails to toggle). Finally, determining if the blocking valve has failed ideally includes toggling the blocking valve, and detecting if both of the first and second pressure switches fail to toggle.

In accordance with another aspect of this embodiment, the method further comprises determining if the first and second pressure switches are operating and positioned properly at vehicle start-up. To this regard, determining if the pressure switches are operating properly at vehicle start-up preferably includes toggling the first trim valve and detecting if the first pressure switch toggles contemporaneously therewith, and toggling the second trim valve and detecting if the second pressure switch toggles contemporaneously therewith.

In accordance with yet another aspect, the method further comprises determining if the first and second trim valves are operating and positioned properly at vehicle start-up. Determining if the trim valves are operating and positioned properly at vehicle start-up respectively includes toggling the blocking valve, and detecting if both the first and second pressure switches toggle.

According to yet another aspect, the first pressure switch is operable to monitor whether the first trim valve is in one of an active state and an inactive state. Likewise, the second pressure switch is preferably operable to monitor whether the second trim valve is in one of an active state and an inactive state.

The above features and advantages, and other features and advantages of the present invention, will be readily apparent from the following detailed description of the preferred embodiments and best modes for carrying out the invention when taken in connection with the accompanying drawings and appended claims.

DESCRIPTION OF THE PREFERRED EMBODIMENT

Figure 1:
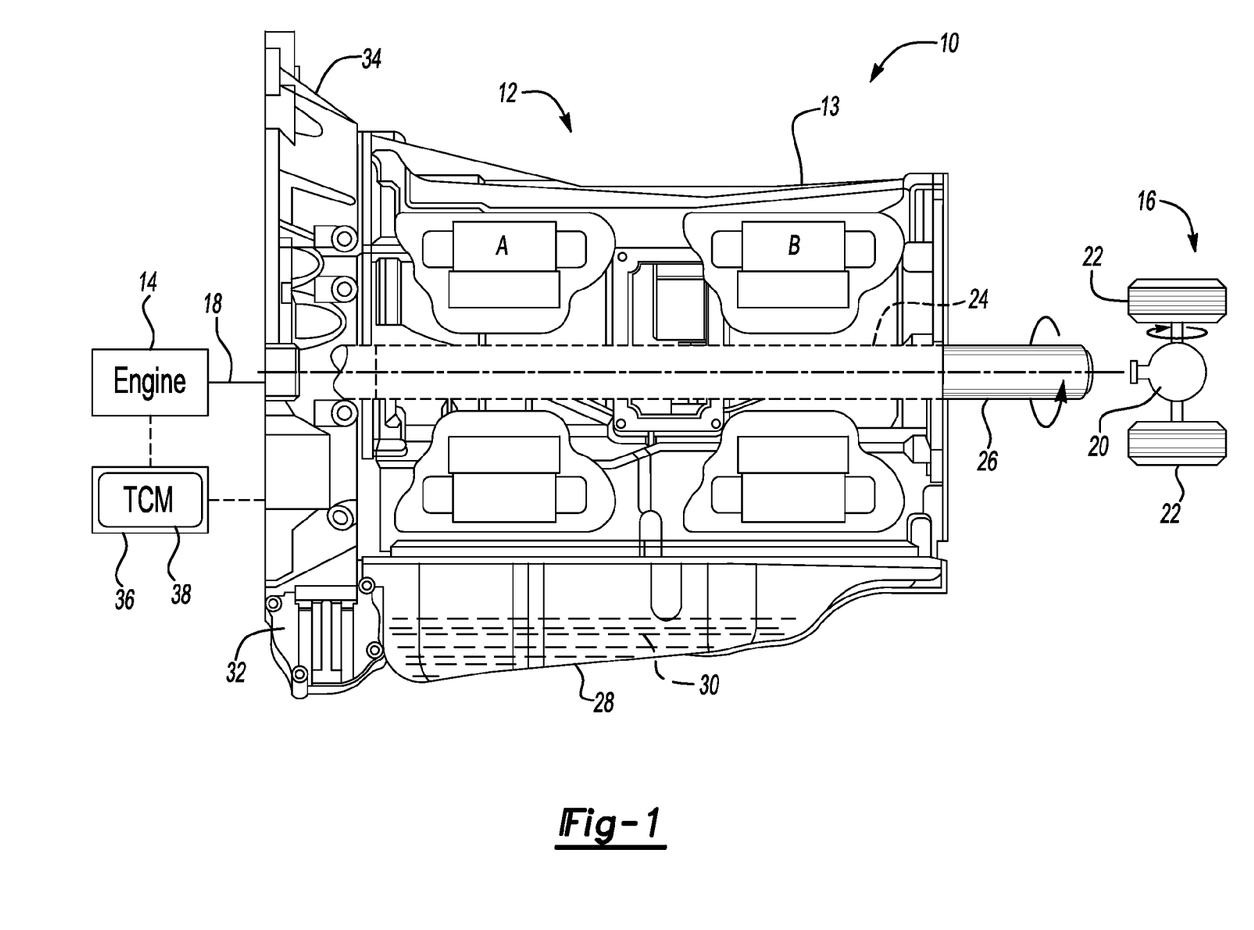
FIG. 1 is a schematic illustration of an exemplary vehicle powertrain arrangement for implementation and practice of the present invention.

The present invention is described herein in the context of the multi-mode hybrid-type powertrain having a multi-speed power transmission shown in FIG. 1. The hybrid powertrain illustrated in FIG. 1 has been greatly simplified, it being understood that further information regarding the standard operation of a hybrid power transmission (or a hybrid-type vehicle for that matter) may be found in the prior art. Furthermore, it should be readily understood that FIG. 1 merely offers a representative application by which the present invention may be incorporated and practiced. As such, the present invention is by no means limited to the particular arrangement illustrated in FIG. 1.

Referring to the drawings, wherein like reference numbers refer to like components throughout the several views, there is shown in FIG. 1 a schematic depiction of an exemplary vehicle powertrain system, identified generally as 10, having a restartable engine 14 drivingly connected to, or in power flow communication with, a final drive system 16 via a hybrid-type power transmission 12. The engine 14 transfers power, preferably by way of torque, to the transmission 12 by an engine output shaft or crankshaft 18. The transmission 12, in turn, distributes torque via a transmission output shaft 26 to drive the final drive system 16, represented herein by a rear differential 20 and wheels 22, and thereby propel the hybrid vehicle (not specifically identified herein). In the embodiment depicted in FIG. 1, the engine 14 may be any engine, such as, but not limited to, a 2-stroke diesel engine or a 4-stroke gasoline engine, which is readily adapted to provide its available power output typically at a number of revolutions per minute (RPM). Although not illustrated in FIG. 1, it should be appreciated that the final drive system 16 may comprise any known configuration, such as front wheel drive (FWD), rear wheel drive (RWD), four-wheel drive (4WD), or all-wheel drive (AWD).

The transmission 12 is adapted to manipulate and distribute power from the engine 14 to the final drive system 16. Specifically, engagement of one or more torque transmitting devices included in the transmission 12 (e.g., a clutch or brake) interconnects one or more epicyclic gear arrangements, preferably in the nature of interconnected planetary gear sets (not shown) to transfer power from the engine 14 at varying ratios to the transmission output shaft 26. The transmission 12 may utilize one or more planetary gear sets in collaboration with, or independent of, one or more clutches and brakes to provide input split, compound split, and fixed ratio modes of operation.

FIG. 1 displays certain selected components of the transmission 12, including a main housing 13 configured to encase and protect first and second electric motor/generator assemblies A and B, respectively. The first and second motor/generators A, B are indirectly journaled onto a main shaft of the transmission 12, shown hidden at 24, preferably through the above noted series of planetary gear sets. The motor/generators A, B operate, in conjunction with the planetary gear sets and selectively engageable torque transmitting mechanisms, to rotate the transmission output shaft 26. The main housing 13 covers the inner most components of the transmission 12, such as the motor/generators A, B, planetary gear arrangements, main shaft 24, and torque transmitting devices. The motor/generator assemblies A, B are preferably configured to selectively operate as a motor and a generator. That is, the motor/generator assemblies A, B are capable of converting electrical energy to mechanical energy (e.g., during vehicle propulsion), and converting mechanical energy to electrical energy (e.g., during regenerative braking).

An oil pan or sump volume 28 (also referred to herein as "hydraulic fluid reservoir") is located on the base of the main housing 13, and is configured to stow or store hydraulic fluid, such as transmission oil (shown hidden in FIG. 1 at 30) for the transmission 12 and its various components. Additionally, an auxiliary (or secondary) transmission pump 32 is mounted to the transmission main housing 13. The auxiliary oil pump 32 is in fluid communication (e.g., via hydraulic circuitry) with the transmission 12 to provide pressurized fluid to the transmission 12 during specific operating conditions, such as engine-off mode and transitionary phases thereto and therefrom.

Figure 2A:
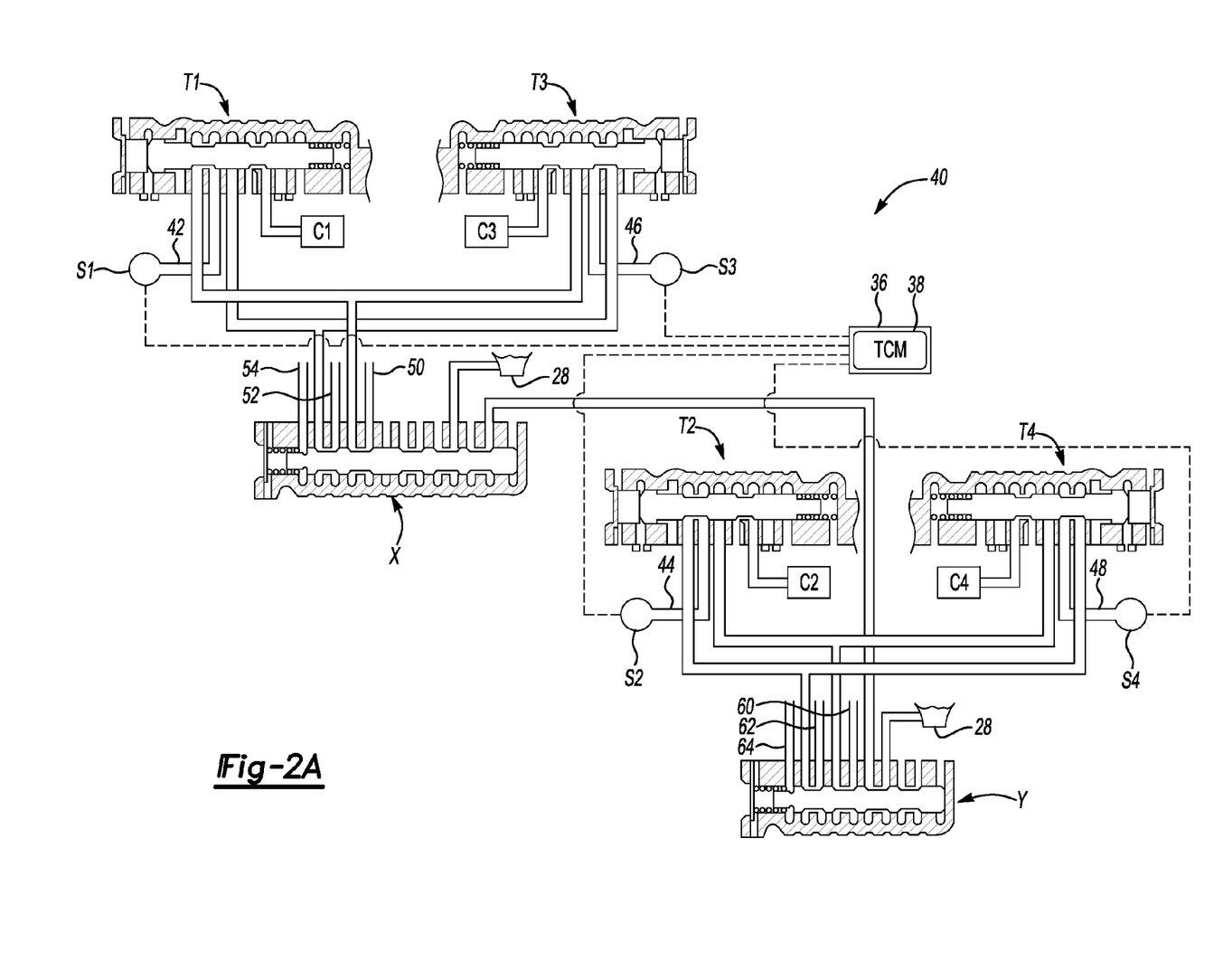
FIG. 2A is a schematic representation of an exemplary hydraulic control module and electronic control unit for carrying out the control of the present invention, illustrating the blocking valves in inactive states.
Figure 2B:
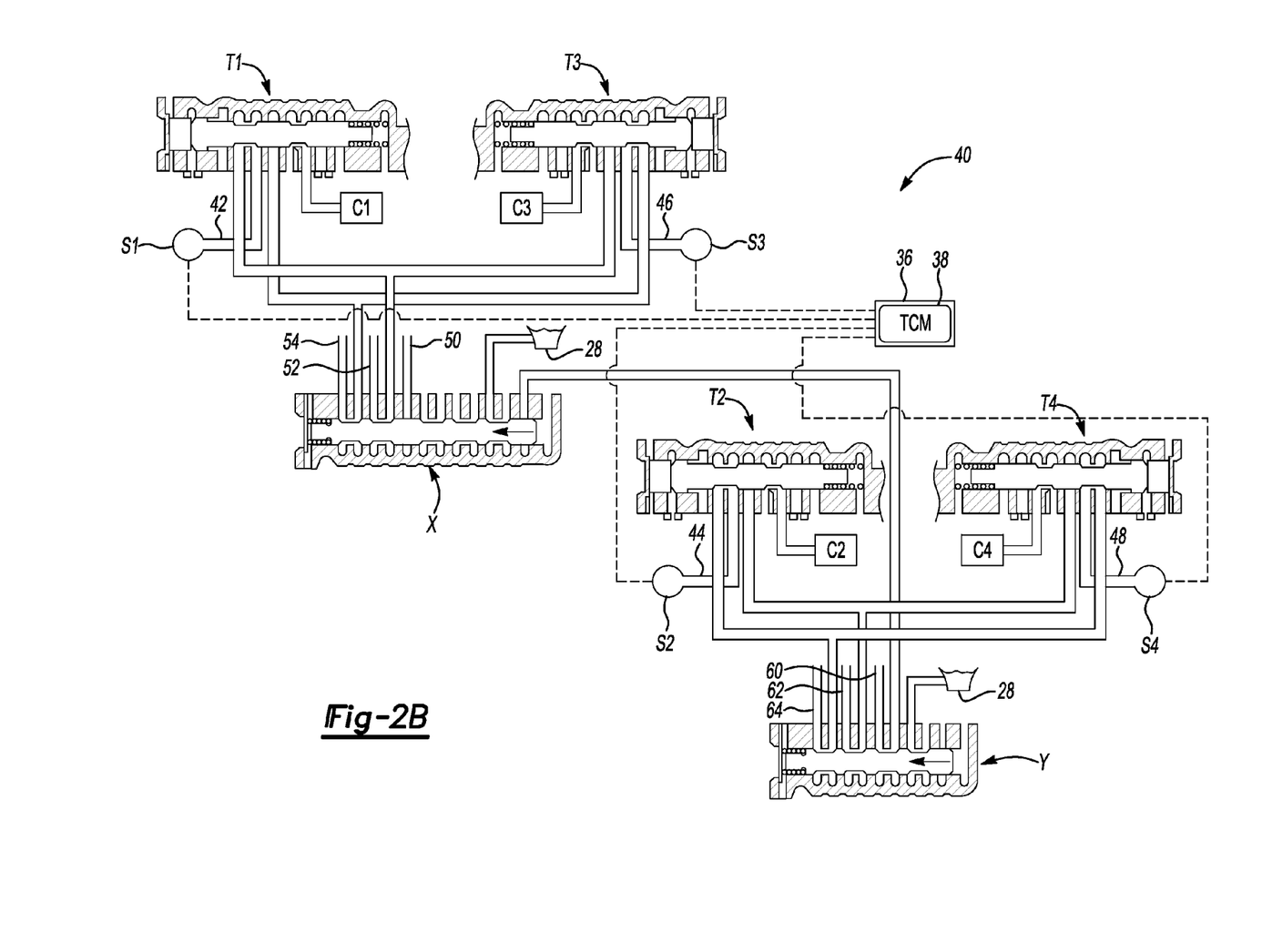
FIG. 2B is a schematic representation of the hydraulic control module and electronic control unit of FIG. 2A, illustrating the blocking valves in active states.

The various hydraulically actuated components of the transmission 12 are controlled by a transmission electro-hydraulic control module (TEHCM), an exemplary embodiment of which is illustrated schematically in FIGS. 2A and 2B and designated generally by reference numeral 40 therein. The electronic portion of the TEHCM 40 is primarily defined by a transmission control module (TCM) 36, which is depicted in FIG. 1 in a representative embodiment as a microprocessor-based electronic control unit of conventional architecture. The TCM 36 is in operative communication with the transmission 12 and the various constituent parts of the TEHCM 40, and operable, at least in part, to control the individual and cooperative operation thereof. The TCM 36 controls the operation of the transmission 12 based on a number of inputs to achieve a desired transmission speed ratio. Such inputs may include, but are not limited to, signals representing the transmission input speed (TIS), a driver torque command (TQ), the transmission output speed (TOS), and the hydraulic fluid temperature (TSUMP). Those skilled in the art will recognize and understand that the means of communication utilized by the TCM 36 is not restricted to the use of electric cables ("by wire"), but may be, for example, by radio frequency and other wireless technology, fiber optic cabling, etc.

The hydraulic portion of the TEHCM 40 is in fluid communication with one or more pump assemblies, such as auxiliary pump 32 (FIG. 1), and various pressure regulators and solenoid-operated fluid control valves (not shown) to develop a regulated pressure line. According to the embodiment of FIG. 2, the hydraulic portion of the TEHCM 40 also includes a plurality of clutch control valves, such as first, second, third, and fourth trim valves T1 through T4, respectively. Recognizably, the numbering of the trim valves T1-T4 (i.e., first, second, third, fourth) may be modified without departing from the scope and spirit of the present invention, and therefore should not be considered limiting. Each clutch trim valve T1-T4 is operable to actuate at least one of the torque transmitting devices in the transmission 12. Specifically, each trim valve is actuated or stroked (e.g., using a solenoid), directing line pressure supply directly to a respective clutch or brake, which allows the clutch to close and transmit torque. When the trim valve destrokes, the clutch cavity is exhausted, disabling the clutch. For example, the first of the trim valves T1 is in fluid communication with both the hydraulic fluid reservoir 28 and a first of the plurality of torque transmitting devices, namely clutch C1. The first trim valve T1 is configured to selectively actuate clutch C1. In a similar respect, the second, third and fourth trim valves T2-T4 are each in fluid communication with a respective torque transmitting device, namely second, third and fourth clutches C2-C4, and the hydraulic fluid reservoir 28. Moreover, each trim valve T2-T4 is configured to selectively actuate its respective clutch C2-C4.

Figure 5:
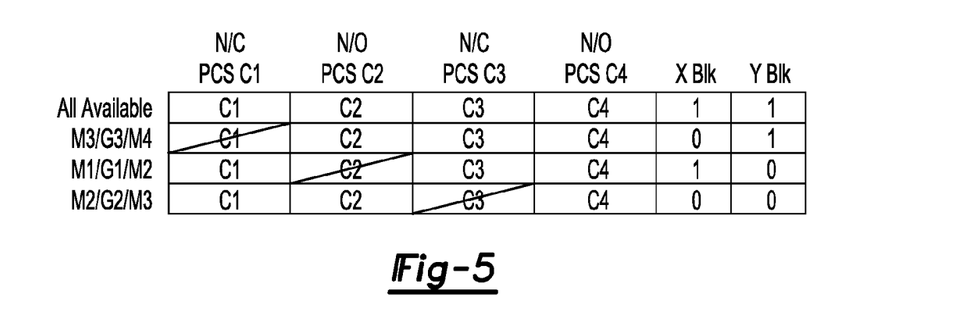
FIG. 5 is a table illustrating the state of the blocking valves of FIGS. 2A and 2B corresponding to the various operating modes of the vehicle powertrain of FIG. 1.

First and second blocking valves, identified in FIGS. 2A-2B as X and Y, respectively, combine to selectively block the line pressure feed to the trim valves T1-T4, preferably in accordance with the mechanization schedule defined in the table of FIG. 5. Specifically, the first blocking valve X is in direct fluid communication with both the first and third trim valves T1, T3. In a similar regard, the second blocking valve Y is in direct fluid communication with both the second and fourth trim valves T2, T4, as well as the first blocking valve X. The supply of hydraulic fluid to the first clutch C1 may be impeded in this arrangement by deactivating or destroking the first blocking valve X (shown destroked in FIG. 2A), and activating or stroking the second blocking valve Y (shown stroked in FIG. 2B). Likewise, the supply of hydraulic fluid to the second clutch C2 may be prevented by activating the first blocking valve X (shown stroked in FIG. 2B), and deactivating the second blocking valve Y (shown destroked in FIG. 2A). As a final example, the supply of hydraulic fluid distributed to the third clutch C3 may be prevented by deactivating both the first and second blocking valves X, Y, as specified in the fourth row of the table in FIG. 5.

Each trim valve T1-T4 has a dedicated pressure switch, denoted S1 through S4, respectively, which determines the position of that particular trim valve. For example, as seen in FIGS. 2A and 2B, the first of the pressure switches S1 is in fluid communication with the first trim valve T1, and in operative communication with the TCM 36. The first pressure switch S1 is configured to monitor whether the first trim valve T1 is in an engaged (stroked) or disengaged (destroked) state, and transmit signals indicative thereof to the TCM 36. That is, when the first trim valve T1 is in one position (e.g., stroked), the first switch track 42 may be pressurized to open the first pressure switch S1, which will communicate this information to the TCM 36. When the first trim valve T1 changes position (e.g., destrokes), the first switch track 42 may exhaust to close the first pressure switch S1. In a similar respect, the second, third and fourth pressure switches S2, S3, S4 are each in fluid communication with a respective trim valve T2, T3, T4, and in operative communication with the TCM 36. The second, third and fourth pressure switches S2, S3 and S4 are configured to monitor whether their respective trim valve T2, T3, T4 is in an engaged (stroked) or disengaged (destroked) state, and transmit signals indicative thereof to the TCM 36. Similar to the first pressure switch S1, when the second, third or fourth trim valve T2, T3, T4 are in one position, a respective switch track 44, 46, and 48 will be pressurized to open the pressure switch S2, S3, S4. When one of the trim valves T2, T3, T4 changes position, its respective switch track 44, 46, 48 will exhaust to close the pressure switch S2, S3, S4.

The first and second blocking valves X and Y also operate to selectively reverse the hydraulic polarity of the pressure switches S1-S4—i.e., change from fill to exhaust, or from exhaust to fill. Specifically, the first blocking valve X, as seen in FIG. 2A, is in fluid communication with the first and third pressure switches S1, S3, and configured to selectively simultaneously reverse the hydraulic polarity of the same. The second blocking valve Y is in fluid communication with the second and fourth pressure switches S2, S4, and configured to selectively simultaneously reverse the hydraulic polarity of the same. The changes in hydraulic polarity may be seen when comparing the hydraulic connections of the various pressure switches S1-S4 in FIG. 2A, where the first and second blocking valves X, Y are destroked, to the hydraulic connections to the pressure switches S1-S4 in FIG. 2B, where the blocking valves X, Y are stroked. For example, in FIG. 2A, a first exhaust path 50 is being communicated to the first pressure switch S1 through trim valve T1 when the first blocking valve X is deactivated, whereas a first fill path 52 is communicated with the third pressure switch S3 through trim valve T3. Contrastingly, the respective hydraulic polarities of the first and third pressure switches swap, as seen in FIG. 2B, when the first blocking valve X is activated or stroked, such that the first fill path 52 is now being communicated with the first pressure switch S1, whereas a second exhaust path 54 is now being communicated to the third pressure switch S3. The same comparison can be made for the second and fourth pressure switches S2, S4 and trim valves T2, T4, and accompanying communication with third and fourth exhaust paths 60 and 64, respectively, or second fill path 62 via second blocking valve Y when comparing FIGS. 2A and 2B.

The TCM 36 has a suitable amount of programmable memory 38 that is programmed to include, among other things, a diagnostic detection methodology for TEHCM 40, namely a method of diagnosing failure of clutch control components in a hydraulic control module, as will be discussed in further detail below. The clutch control components include at least two trim valves, each in operative communication with a respective pressure switch, and a blocking valve in fluid communication with the two trim valves and pressure switches. The present invention is described herein with respect to the arrangement illustrated in FIGS. 1 and 2A-2B as an exemplary application by which the methods of the present invention may be practiced. The present invention, however, may also be employed in other powertrain and transmission assemblies without departing from the intended scope of the present invention.

The TCM 36 operates to continuously monitor and detect if any of the pressure switches in the TEHCM 40 unintentionally toggles (i.e., switches position). As noted above, any commanded change in position of a given trim valve T1-T4, should result in a change of state of that valves designated pressure switch S1-S4. In a similar regard, for a commanded change in position of a blocking valve X or Y, two pressure switches S1 and S3 or S2 and S4, respectively, should contemporaneously change state. Thus, a single pressure switch unexpectedly changing state (i.e., inadvertently toggling) indicates an unexpected or inadvertent change in position of a trim valve. The TCM 36 responds to a pressure switch unintentionally toggling by shifting the transmission 12 to a safe operating mode. Shifting the transmission 12 to a safe operating mode includes disabling the respective trim valve T1-T4 and, thus, associated clutch C1-C4, that is in operative communication with the pressure switch S1-S4 that unintentionally toggled. By changing the position of the associated blocking valve X or Y to lock out the given clutch C1-C3, the TCM 36 is given the opportunity to determine if the trim valve actually changed position, or the pressure switch connected thereto has failed.

Next, the TCM 36 determines or identifies which of the clutch control components failed. According to preferred practice, the TCM 36 identifies the failed clutch control component by: determining if the pressure switch that unintentionally toggled has failed; if it didn't, determining if the respective trim valve that is in operative communication with the pressure switch that unintentionally toggled has failed; and determining if the blocking valve has failed if the respective trim valve has not failed. Notably, the order of these steps may be varied, and may be assessed simultaneously.

Figure 3:
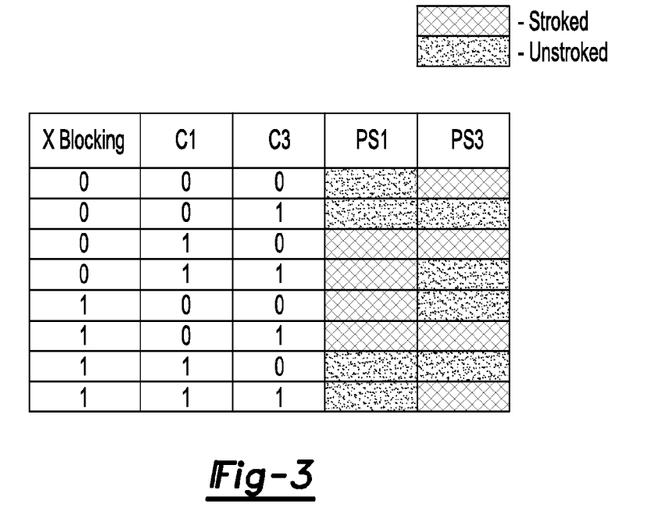
FIG. 3 is a table mapping the expected mechanization sequence of the first and third pressure switches of FIGS. 2A and 2B corresponding to the engagement of certain torque-transmitting devices in the transmission of FIG. 1.
Figure 4:
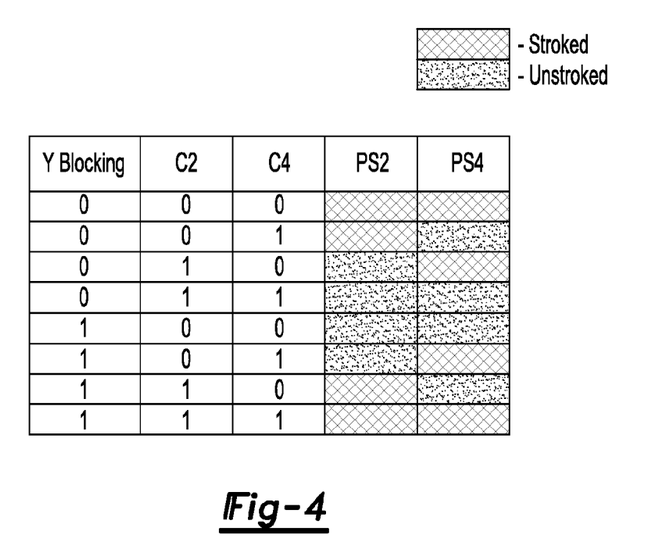
FIG. 4 is a table mapping the expected mechanization sequence of the second and fourth pressure switches of FIGS. 2A and 2B corresponding to the engagement of certain torque-transmitting devices in the transmission of FIG. 1.

The mechanization above provides the ability to safely determine if the pressure switch has failed by toggling the blocking valve in communication therewith, and detecting if one of the pressure switches fails to toggle. By way of example, if the first pressure switch S1 unintentionally toggles, the TCM 36 can determine if switch S1 is the failed clutch control component by toggling the first blocking valve X, and detecting if only the third pressure switch S3 toggles, which can be seen by comparing row 2 and row 6 of the table in FIG. 3. If the first pressure switch S1 responds properly, the TCM 36 will determine that the first trim valve T1 has failed (e.g., is stuck). That is, by toggling the first blocking valve X, and detecting that the first pressure switch S1 toggles, one can deduce from the relationship described above that the first trim valve T1 is the failed clutch control component. Finally, if the first blocking valve X is toggled, and the TCM 36 detects that neither of the first and second pressure switches S1 or S3 toggles, the TCM 36 will identify the first blocking valve X as the failed component.

Once the failed clutch control component is identified, the TCM 36 can determine any undesirable transmission operating modes that require use of the failed clutch control component, and operate the transmission 12 in an operating mode other than the undesirable operating modes. Referring to FIG. 5, the mode operations M1 through M4 for the hybrid transmission 12 are when two clutches (e.g., C1 and C2, or C3 and C4) are applied, and the transmission is effectively operating as an electrically-variable transmission (EVT), where the speed of the first and second motor/generator assemblies A, B are used to vary the ratio between the speed of engine 14, and the transmission output speed. The gear operations G1-G3 are instances where three of the clutches C1-C4 are applied, and there is a fixed ratio between engine speed and transmission output speed—e.g., the transmission 12 is operating like a traditional step ratio automatic transmission. As the vehicle operator commands higher and lower output speed/torque, the TCM 36 can navigate through the various modes M1-M4 and gears G1-G3 to produce the desired results. The mode-mode, gear-mode, gear-gear shifts are simply the type of shift being executed. For example, in a mode 1 to gear 1 (M1/G1) shift, the transmission 12 transitions or shifts from operating in M1 with the first and third clutches C1, C3 applied, to gear 1 G1 by adding the fourth clutch C4. The TCM 36 can also execute mode-mode and gear-gear shifts by commanding double clutch transitions. By identifying which of the mode-mode, gear-gear, and mode-gear states require use of the failed clutch component, the TCM 36 can operate in an alternate state without compromising operator feel or the integrity of the TEHCM 40.

The TCM 36 is preferably also configured to determine if the pressure switches S1-S4 are operating properly at vehicle start-up. To this regard, determining if the pressure switches are operating properly at vehicle start-up preferably includes toggling the each of the trim valves T1-T4, and detecting or monitoring to see if each respective pressure switch S1-S4 toggles contemporaneously therewith. In a similar respect, the TCM 36 can determine if each of the trim valves T1-T4 is operating properly at vehicle start-up, for example, by toggling the each blocking valve X and Y, and monitoring to see that both the pressure switches in communication therewith contemporaneously toggle.

The methods of the present invention preferably include at least those steps identified above. Nevertheless, it is within the scope and spirit of the claimed invention to omit steps, include additional steps, and/or modify the order presented herein. It should be further noted that the method described above represents a single diagnostic cycle. However, it is contemplated that the method be applied in a systematic manner on a "real-time" basis.

The present invention allows for complete diagnoses of the clutch control system in the multi-mode hybrid-type transmission 12. Always knowing the position of each of the clutch control valves allows the software to know the available clutches and maintain safe operation of the hybrid system by blocking undesired mode-mode, mode-gear, gear-gear shifts. The mechanization of the switches allows the system to utilize an existing TEHCM containing only four switches which reduces cost and validation associated with designing a new TEHCM. The mechanization provides for continuous diagnostic on the position of the valves, but also the state of health of the switches.

While the best modes for carrying out the present invention have been described in detail hereinabove, those familiar with the art to which this invention relates will recognize various alternative designs and embodiments for practicing the invention within the scope of the appended claims.

The invention claimed is:

1. A hydraulic control module for a vehicle transmission having a plurality of torque transmitting devices, the hydraulic control module comprising:
    a controller;
    a first trim valve in fluid communication with a first of the plurality of torque transmitting devices and configured to selectively actuate the same;
    a second trim valve in fluid communication with a second of the plurality of torque transmitting devices and configured to selectively actuate the same;
    a first pressure switch in fluid communication with said first trim valve and in operative communication with said controller, wherein said first pressure switch is configured to monitor whether said first trim valve is in an engaged or disengaged state and transmit signals indicative thereof to said controller;
    a second pressure switch in fluid communication with said second trim valve and in operative communication with said controller, wherein said second pressure switch is configured to monitor whether said second trim valve is in an engaged or disengaged state and transmit signals indicative thereof to said controller; and
    a first blocking valve in fluid communication with said first and second trim valves and said first and second pressure switches;
    wherein said controller is operable to detect if at least one of said first and second pressure switches unintentionally toggles; and
    wherein said controller is operable to shift the transmission to a safe operating mode in response to said at least one of said first and second pressure switches unintentionally toggling.

2. The hydraulic control module of claim 1, wherein said first blocking valve is configured to selectively simultaneously reverse a first hydraulic polarity of said first pressure switch and a second hydraulic polarity of said second pressure switch.

3. The hydraulic control module of claim 1, wherein shifting the transmission to a safe operating mode includes disabling respective ones of said first and second trim valves in operative communication with said at least one of said first and second pressure switches that unintentionally toggle.

4. The hydraulic control module of claim 1, further comprising:
    a third trim valve in fluid communication with a third of the plurality of torque transmitting devices and configured to selectively actuate the same;
    a fourth trim valve in fluid communication with a fourth of the plurality of torque transmitting devices, and configured to selectively actuate the same;
    a third pressure switch in fluid communication with said third trim valve and in operative communication with said controller, and configured to monitor whether said third trim valve is in an engaged or disengaged state and transmit signals indicative thereof to said controller;
    a fourth pressure switch in fluid communication with said fourth trim valve and in operative communication with said controller, and configured to monitor whether said fourth trim valve is in an engaged or disengaged state and transmit signals indicative thereof to said controller; and
    a second blocking valve in fluid communication with said third and fourth trim valves and said third and fourth pressure switches;
    wherein said controller is further operable to detect if at least one of said third and fourth pressure switches unintentionally toggles; and
    wherein said controller is further operable to shift the transmission to a safe operating mode in response to said at least one of said third and fourth pressure switches unintentionally toggling.

5. The hydraulic control module of claim 4, wherein said second blocking valve is configured to selectively simultaneously reverse a third hydraulic polarity of said third pressure switch and a fourth hydraulic polarity of said fourth pressure switch.

6. The hydraulic control module of claim 4, wherein shifting the transmission to a safe operating mode further includes disabling respective ones of said third and fourth trim valves in operative communication with said at least one of said third and fourth pressure switches that unintentionally toggle.

7. The hydraulic control module of claim 1, wherein said controller is further operable to identify a failed clutch control component in response to said at least one of said first and second pressure switches unintentionally toggling; determine undesirable transmission operating modes that require use of said failed clutch control component; and command the transmission to operate in a transmission operating mode other than said undesirable operating modes.

8. The hydraulic control module of claim 7, wherein said identifying a failed clutch control component includes:
    determining if said at least one of said first and second pressure switches has failed;
    determining if respective ones of said first and second trim valves in operative communication with said at least one of said first and second pressure switches that unintentionally toggle have failed; and
    determining if said first blocking valve has failed.

9. The hydraulic control module of claim 8, wherein said determining if said at least one of said first and second pressure switches has failed includes toggling said first blocking valve and detecting if said at least one of said first and second pressure switches fails to toggle.

10. The hydraulic control module of claim 8, wherein said determining if respective ones of said first and second trim valves have failed includes toggling said first blocking valve and detecting if said at least one of said first and second pressure switches toggles.

11. The hydraulic control module of claim 8, wherein said determining if said first blocking valve has failed includes toggling said blocking valve and detecting if both of said first and second pressure switches fail to toggle.

12. A method of diagnosing failure of clutch control components in a hydraulic control module of a power transmission, the clutch control components including at least a first trim valve in operative communication with a first pressure switch, a second trim valve in operative communication with a second pressure switch, and a blocking valve in fluid communication with the first and second trim valves and the first and second pressure switches, wherein the first and second pressure switches toggle in response to toggling of a respective trim valve, the method comprising:
- detecting if at least one of the first and second pressure switches unintentionally toggles;
- shifting the transmission to a safe operating mode in response to said at least one of the first and second pressure switches unintentionally toggling;
- determining a failed clutch control component if at least one of the first and second pressure switches unintentionally toggles;
- determining undesirable transmission operating modes that require use of said failed clutch control component; and
- operating the transmission in a transmission operating mode other than said undesirable operating modes.

13. The method of claim 12, wherein said shifting the transmission to a safe operating mode includes disabling respective ones of the first and second trim valves in operative communication with said at least one of the first and second pressure switches that unintentionally toggle.

14. The method of claim 12, wherein said determining a failed clutch control component includes:
- determining if said at least one of the first and second pressure switches has failed;
- determining if respective ones of the first and second trim valves in operative communication with said at least one of said first and second pressure switches that unintentionally toggle have failed; and
- determining if the blocking valve has failed.

15. The method of claim 14, wherein said determining if said at least one of the first and second pressure switches has failed includes toggling the blocking valve and detecting if said at least one of the first and second pressure switches fails to toggle.

16. The method of claim 14, wherein said determining if respective ones of the first and second trim valves have failed includes toggling the blocking valve and detecting if said at least one of the first and second pressure switches toggles.

17. The method of claim 14, wherein said determining if the blocking valve has failed includes toggling the blocking valve and detecting if both of the first and second pressure switches fail to toggle.

18. The method of claim 12, further comprising:
- determining if the first and second pressure switches are operating properly at vehicle start-up, wherein said determining if the first and second pressure switches are operating properly at vehicle start-up includes toggling the first trim valve and detecting if the first pressure switch toggles, and toggling the second trim valve and detecting if the second pressure switch toggles.

19. The method of claim 12, further comprising:
- determining if the first and second trim valves are operating properly at vehicle start-up, wherein said determining if the first and second trim valves are operating properly at vehicle start-up respectively includes toggling the blocking valve and detecting if both the first and second pressure switches toggle.

20. The method of claim 12, wherein the first pressure switch is operable to monitor whether the first trim valve is in one of an active state and an inactive state, and wherein the second pressure switch is operable to monitor whether the second trim valve is in one of an active state and an inactive state.

* * * * *